United States Patent [19]
Suzuki et al.

[11] Patent Number: 5,711,807
[45] Date of Patent: Jan. 27, 1998

[54] COATING APPARATUS

[75] Inventors: Akihiro Suzuki; Norio Shibata; Shinsuke Takahashi; Mikio Tomaru, all of Kanagawa, Japan

[73] Assignee: Fuji Photo Film Co., Ltd., Kanagawa, Japan

[21] Appl. No.: 304,238

[22] Filed: Sep. 12, 1994

Related U.S. Application Data

[63] Continuation-in-part of Ser. No. 16,470, Feb. 11, 1993, abandoned.

Foreign Application Priority Data

Feb. 13, 1992 [JP] Japan .................... 4-059421

[51] Int. Cl.$^6$ ............................................. B05C 3/02
[52] U.S. Cl. ........................................ 118/413; 118/419
[58] Field of Search ........................... 118/410, 413, 118/419; 427/356

[56] References Cited

U.S. PATENT DOCUMENTS

| | | |
|---|---|---|
| 4,537,801 | 8/1985 | Takeda ............................ 118/410 |
| 4,748,057 | 5/1988 | Kageyama et al. ............... 118/410 |
| 5,072,688 | 12/1991 | Chino et al. ..................... 118/419 |
| 5,133,281 | 7/1992 | Eriksson ........................... 118/411 |
| 5,136,972 | 8/1992 | Naka et al. ....................... 118/411 |
| 5,145,528 | 9/1992 | Watanabe et al. ................. 118/411 |

*Primary Examiner*—Brenda A. Lamb
*Attorney, Agent, or Firm*—Sughrue,Mion,Zinn, Macpeak & Seas, PLLC

[57] ABSTRACT

An apparatus for high speed manufacturing of thin-film coated products, wherein the coating thickness is even and the products do not contain uneven streaks. The apparatus includes a coating head having a frontedge disposed on an upstream side of a support, a backedge disposed on a downstream side of the support, and a top end receding stepwise away from the frontedge and away from the support. The backedge has an acute-angled top end portion. The coating apparatus is configured so that filtration centralline waves ($W_{CA}$) are formed in a direction perpendicular to the direction of movement of the support. These waves are formed in slit inner surfaces, a frontedge surface and a backedge surface of a top end portion of the coating head. Each wave in these surfaces is less than or equal to 0.2 μm in length.

10 Claims, 3 Drawing Sheets

5,711,807

COATING APPARATUS

This is a Continuation-In-Part of application Ser. No. 08/016,470 filed Feb. 11, 1993 now abandoned.

BACKGROUND OF THE INVENTION

The present invention relates to an extrusion-type coating apparatus for coating the surface of a moving support at high speed with a thin-film coating composition having a uniform thickness.

Conventional extrusion-type coating apparatuses have been proposed for coating the surface of a moving support with a coating composition. One conventional method seals an upstream-side of a coating head with a pre-coating layer to prevent air from passing with the coating layer onto the support. This method has been implemented by using a pre-coating with a composition having the same components throughout (see Japanese Patent Unexamined Publication No. Sho. 58-205561). This method has also been implemented by coating the support with a solvent as a pre-coating (see Japanese Patent Unexamined Publication No. Sho. 61-139929). These pre-coating methods enable a thin film coating to be extruded at high speed.

However, if these pre-coating methods are applied to an extrusion-type coating apparatus, the pre-coating layer must be pressed between the downstream edge of the coating head and the support in order to smooth out the coating layer. Thus, if the support has an uneven portion along the width direction thereof, the thickness of the coating film will also be uneven along its width. Further, if foreign material is present on the support or in the pre-coating layer or pre-coating composition, the foreign matter may be trapped at the downstream edge of the coating head, causing streaks in the coated layers.

Various coating compositions are commonly employed, such as a photographic photosensitive coating composition, a magnetic coating composition, a surface-protection/charge-prevention or smoothing coating composition. These compositions may be used for various products, such as photographic film printing papers, magnetic recording media, etc.

The present applicant improved the above-described coating apparatus (see Japanese Patent Unexamined Publication No. Sho. 63-20069) by preventing variations in coating film thickness caused by streak faults, uneven support thickness, variations in Young's modulus, and so on. Applicant's coating apparatus also reduced the pressure loss that previously occurred when a coating composition passed through a slot.

Specifically, as disclosed in Japanese Patent Unexamined Publication No. Sho. 63-20069 and with reference to FIG. 4, a coating apparatus is provided for forming a coating layer on a support 1 having a coating surface. The coated surface is liquid-sealed with an organic solvent 11 applied thereto in advance using an extrusion-type coating head having a frontedge 2 disposed on the upstream side of the support (with respect to the direction of movement). The coating head has a backedge 3 disposed on the downstream side of the support in the direction away from the support. The backedge 3 has a top end which recedes stepwise away from the frontedge and has an acute-angled top end portion.

In operation, first the coating surface of the support is coated with an organic solvent using a known coating apparatus such as a gravure coater, a roll coater, a blade coater, an extrusion coater, or the like. These coaters apply a layer that prevents air at the frontedge of the head from being taken up into the coating layer, thereby making it possible to maintain a coating state with no faults and to perform high speed coating.

The frontedge 2 is disposed on the upstream side of the support 1 away from the exit of the slit 8. The frontedge 2 is formed so that the entire area of the edge surface opposite to the support 1 bulges toward the support 1. Although the bulging surface is generally formed with a predefined curved surface, the shape is not limited to this shape. Any shape may be used so long as it can prevent air from being passed along with the coating layer.

The backedge 3 is disposed so that its top end portion is positioned away from a tangential line extending from the exit point of the frontedge 2 and parallel to the support. Consequently, the support 1 does not apply pressure against the backedge 3, thereby preventing foreign matter from being trapped between the backedge 3 and the support. This arrangement also prevents the support from being scraped. Also, the thickness of the coating film is hardly influenced by irregularities in the support thickness such as depressions or the like. Accordingly, this arrangement provides superior products.

However, in an extrusion-type coating head as shown in FIG. 4, many streaks may be produced depending on the surface roughness of a slit inner surface 4, a frontedge surface 5 and a backedge surface 6 of the coating head's top end portion, and the condition of edge angled portions 9 and 10. Thus, although the slit inner surface 4, the frontedge surface 5 and the backedge surface 6 in the above-mentioned coating head are ground into required shapes with a high degree of accuracy with a grinding machine, undesirable conditions may still occur. These undesirable conditions include rough surfaces, crooked edge angle portions 9 and 10, etc. These conditions depend on the conditions under which the grinding process is carried out, such as the feeding speed, the cutting depth, the grind-stone selection and the like. Also, the material used for coating the head top end portion affects conditions such as the surface roughness, the straightness of the edge angled portions 9 and 10, and so on. These undesirable conditions are apt to appear directly on the coating surface.

To avoid these undesirable conditions, a conventional coating head has been provided with a doctor edge (backedge) (Japanese Patent Unexamined Publication Sho 60-238179), which smooths the coating composition. Thus, even if the slit inner surface 4, the frontedge surface 5 and the backedge surface 6 have somewhat rough or broken surfaces, the above problems can be minimized by smoothing the coating. The fluid function of the coating composition immediately after application may be increased by internal stress produced by increasing the pressure on the coating composition during the above-described smoothing operation. Accordingly, the surface roughness of the respective edge surfaces when finished can be minimized and compensated for by the liquid behavior of the coating composition extruded from the slit. However, in a coating head of the type that does not apply high pressure to the coating composition at the time of coating (FIG. 4), coating streaks and an uneven thickness often occur, thereby causing deterioration in the quality of the coating surface.

Further, if a coating apparatus is used which does not have a doctor edge to perform smoothing, the surface roughness or broken state of a slit inner surface and a frontedge surface may cause faults other than streaks, such as an uneven thickness, depending of the degree of straightness of the respective surfaces. Accordingly, surface roughness or broken states must be prevented in the slit inner surface, the frontedge surface and the backedge surface. Also, it is especially necessary that the coating be straight in the direction of the slit width.

However, the conditions of the ground or surface-finished state of the coating head can only be improved to a limited extent with the above-described techniques.

Further, the problem in the streaks is caused by the following reason.

Although the slit inner surface 4, the frontedge surface 5 and the backedge surface 6 in the above-mentioned coating head are ground into required shapes with a high accuracy by using a grinding machine, undesirable conditions may occur in the surface roughness, the straightness of the edge angled portions 9 and 10, etc., in accordance with the conditions at this grinding process, such as the feeding speed, the cutting-in depth, the selection of grind-stone, or the like, or some material of the coating head top end portion makes conditions, such as the surface roughness, the straightness of the edge angled portions 9 and 10, and so on, so that there is a tendency that these undesirable conditions are apt to appear on the coating surface directly.

That is, in a conventional coating head having a doctor edge which is disclosed in, for example, Japanese Patent Unexamined Publication No. Sho. 60-238179, or like, a coating composition is smoothed by the doctor edge (backedge) so that even if the slit inner surface 4, the frontedge surface 5 and the backedge surface 6 mentioned above are somewhat poor in their surface roughness or broken state, the fluid function of the coating composition immediately after application is increased by an internal stress produced by the pressure added to the coating composition as the result of the above smoothing function. Accordingly, it can be estimated that the finished states of surface roughness of the respective edge surfaces can be compensated by the liquid behavior of the coating composition ejected from a slit. It can be however considered that in a coating head of the type not to add high pressure to a coating composition at the time of coating as shown in FIG. 4, coating streaks or unevenness of thickness is apt to appear to cause deterioration in the quality of the coating surface, compared with the type to add pressure.

SUMMARY OF THE INVENTION

It is an object of the present invention to provide a coating apparatus which overcomes the above-described problems by suppressing variations in thickness along the width of a coating film.

It is another object of the invention to provide a non-pressure-type coating head that prevents variations in the coating film thickness caused by an uneven support thickness so that products coated with a thin film have a faultless, even and uniform coating thickness.

It is a further object of the invention to provide a magnetic recording media having a superior electromagnetic conversion characteristic and which can be manufactured stably at a high speed.

The foregoing and other objects of the invention are attained by a coating apparatus for coating one or more types of coating compositions using an extrusion-type coating head which has a frontedge and a backedge. The frontedge is disposed on the upstream side in the direction of support movement, and the backedge is disposed on the downstream side in the direction of support movement. The backedge has a top end which recedes stepwise in a direction away from the support and has an acute-angled top end portion. The invention includes filtration central-line waves ($W_{CA}$) in the coating head. These waves are no larger than 0.2 μm at the respective surfaces. These central-line waves are aligned along the support width direction of the slit inner surface, the frontedge surface and the backedge surface of a top end portion of the coating head. The coating head forms a coating layer on a coating surface of the support and is sealed with a low-viscosity composition applied in advance thereto.

DESCRIPTION OF THE PREFERRED EMBODIMENTS

Figure 1:
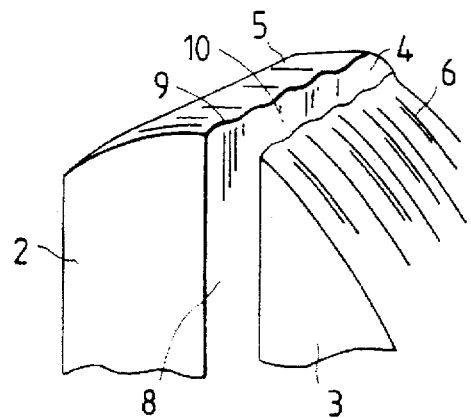
FIG. 1 is a perspective view of a main portion of a first embodiment of a coating apparatus constructed according to the present invention.
Figure 2:
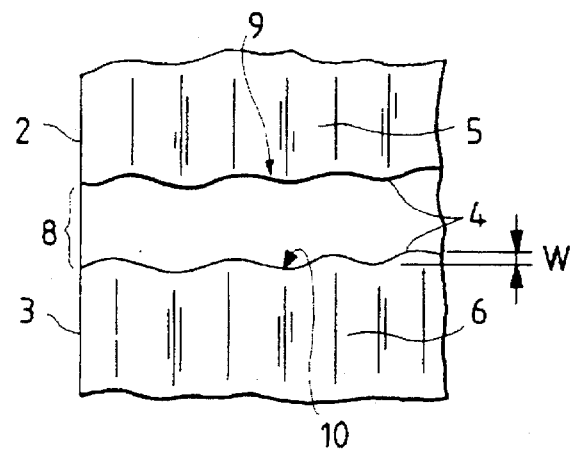
FIG. 2 is a plan view of a main portion of the embodiment of the coating apparatus according to the present invention shown in FIG. 1.

A preferred embodiment of the present invention will be described in detail with reference to accompanying drawings. FIG. 1 is an expanded perspective view of a main portion of a coating head according to a first embodiment of the invention, FIG. 2 is an expanded plan view of a main portion of the coating head of FIG. 1, and FIG. 3 is a schematic sectional view illustrating a cross-sectional shape of the main portion of the coating head of FIG. 1.

Figure 3:
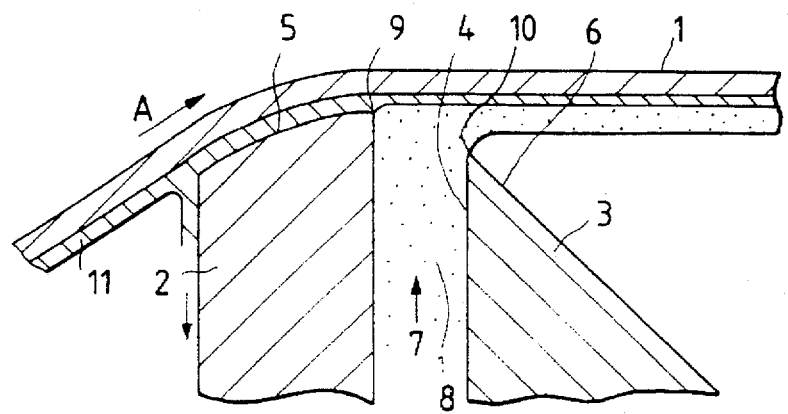
FIG. 3 is a schematic sectional view of the first embodiment of the coating apparatus according to the present invention.
Figure 4:
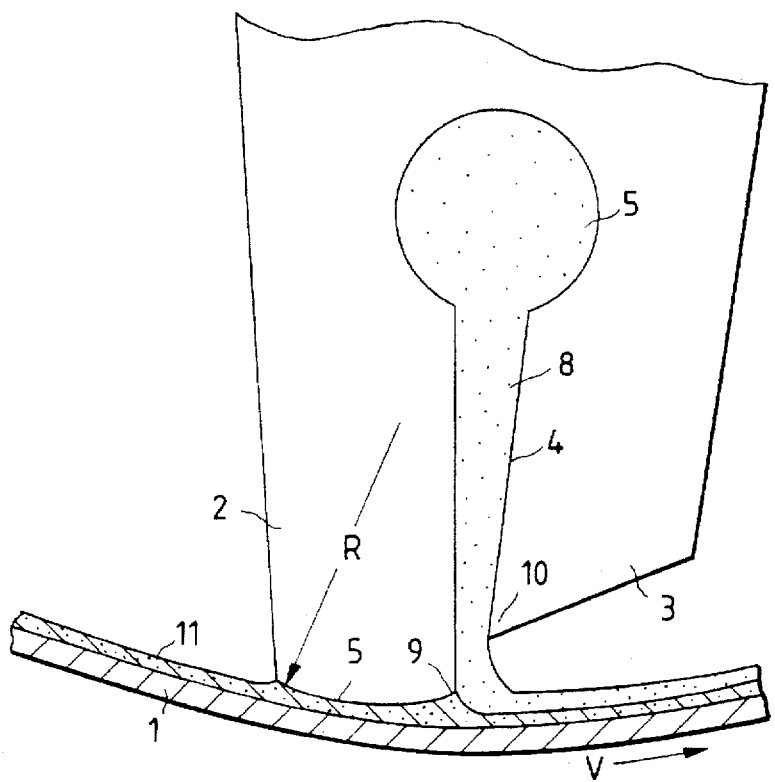
FIG. 4 is a side sectional view of a conventional coating apparatus.

In this embodiment, a frontedge 2 is disposed on the upstream side of a support 1 (with respect to the direction A of support movement indicated in FIG. 3) away from the exit of a slit 8. The frontedge 2 extends toward the support 1 further than the top end portion of a backedge 3 disposed on the downstream side of the coating head. An angled portion 10 of the top end of the backedge 3 has an acute-angled shape as illustrated in FIG. 1. This angled portion 10 is positioned downward from a tangential line drawn from an angled portion 9 of the frontedge 2 parallel to the support surface.

In operation, using this coating apparatus, a coating surface of the support 1 is coated with a coating composition 7 while sealing an interval between the coating surface and the frontedge 2 with a low-viscosity pre-coating composition 11 pre-applied onto the coating surface as shown in FIG. 3. More specifically, in this embodiment, coating is performed during the sealing operation by scraping the pre-coating composition 11 on the upstream side of the frontedge 2. In the drawings, the frontedge 2 is formed so that its entire edge surface 5 opposite to the support 1 bulges toward the support 1. Although the surface 5 generally is curved in the direction of the support, the shape of the surface 5 is not limited to this shape, but instead any shape may be used so long as it can prevent air from being taken up with the composition 11.

As has been described, the backedge 3 has a sharp edge nearest the support at the exit point of the slit 8. Thus, the coating composition, upon being extruded from the slit 8, is separated in the top end portion by the sharp edge and is applied in an uneven state, without being pressed onto the support.

The slit inner surface 4, the frontedge surface 5 and the backedge surface 6 are formed with waves therein along the direction of support width (FIGS. 1 and 2). Since the coating head is not used to smooth the coating, these waves in the respective surfaces define the shape when the coating composition is separated from the slit 8. These waves largely influence the characteristic of the coating surface during high speed coating of a thin layer. The angled portion 9 is the point at which the frontedge surface 5 meets the slit inner surface 4. The angled portion 10 is the point at which the slit inner surface 4 meets the backedge surface 6. Thus, the waves of the respective pairs of sections of the surfaces are overlaid and largely influence the state of the coating surface.

Taking the above into consideration, Applicant extensively studied the surface accuracy of the ground slit inner surface 4, the frontedge surface 5 and the backedge surface 6 from the viewpoint of the surface wave along the width of the support 1. It has been found that a substantially even coating film thickness is produced when the average height of each filtration central-line wave ($W_{CA}$) is not larger than 0.2 μm (i.e., W 23 0.2 μm, where W is the average height of each wave, as illustrated in FIG. 2).

The filtration central-line wave ($W_{CA}$) defined in the present invention was measured in such a manner that the respective surfaces are traced with a contact needle along the width of the support. When the ($W_{CA}$) is used, a short wavelength component of surface roughness and a long wavelength component of the surface evenness are deleted from a curve of a section of the support traced by the needle. The measured reference length L was 25 mm, and a high-band cut-off value ($f_h$) was 0.8 mm. Sufficient results were obtained when the filtration central-line wave was not larger than 0.2 μm, and even better results were obtained when the ($W_{CA}$) was not larger than 0.1 μm.

It is sufficient if the slit inner surface 4, the frontedge surface 5 and the backedge surface 6 are arranged under the surface central-line roughness average ($R_a$) not larger than 1.0 μm, which is relatively large in comparison to the filtration central-line wave. Although the formation of a single layer of a coating composition has been described, the present invention may be applied to a multi-layer coating such as two layers, three layers, and so on. The low-viscosity composition containing an organic solvent as a main component according to the present invention may be a liquid of a single solvent or a combination of organic solvents such as toluene, methyl ethyl ketone, butyl acetate, cyclohexane, etc., or the above-mentioned liquid in which a binder is dissolved. The viscosity of the liquid is selected to be not higher than 20 cp, preferably not higher than 5 cp. The binder that is used in the coating composition is described later.

According to the present invention, the coating surface of a support is initially coated with a low-viscosity liquid using a generally known coating apparatus, such as a gravure coater, a roll coater, a blade coater, an extrusion coater, or the like. This pre-applied low-viscosity liquid prevents air from being caught on the upstream side of the frontedge when a coating composition is applied. The present invention can be practiced using one or more coating layers, such as a single magnetic layer, a magnetic layer having a multi-layer structure, or a combination of magnetic and non-magnetic layers including at least one magnetic layer in the case of a magnetic recording medium. Other known layer structures may of course, be used.

FIG. 2 shows the shape of a coating head, and the positional relationship between the coating head and a support. The frontedge 2, which is disposed along the support 1 on the upstream side of the exit of the slit 8, projects closer to the support 1 than the top end portion of the backedge 3. The frontedge 2 is formed so that the entire area of the frontedge surface 5 opposite to the support 1 bulges toward the support 1. Although a curved surface having a certain curvature is generally used as the shape of the portion bulging toward the support, the shape of this surface is not limited to this particular shape. Any shape may be used so long as it prevents air from passing under the frontedge 2. The backedge 3 is disposed so that its top end portion is positioned, in the direction away from the support, beyond a tangential line extending downstream from the frontedge 2. The backedge 3 has a sharp edge coming nearest to the support at the exit portion of the slit 8, so that the coating composition extruded from the slit 8 is separated at the sharp edge top end portion. However, the ejected coating composition is not smoothed on the downstream side.

Although the above-described coating head is disposed between two guide rollers, another coating head may be provided between the coating head and the guide roller on the upstream side of the coating head. This second coating head applies a pre-coating composition. The lap angle in the coating head is between 2° and 60°. While the span to make a lap in this coating head is generally 50 to 3,000 mm, it is not limited in this range.

Various techniques are used for the liquid feeding system depending on the type of the coating composition. Particularly, when a magnetic coating composition is used that has a coagulation characteristic, it is preferable to use a shearing process. Specifically, reference is made to Japanese Patent Application No. Sho. 63-63601 and Japanese Patent Unexamined Publication No. Sho. 62-95174. When no rotor is used (Japanese Patent Application No. Sho. 63-63601) preferably the diameter of the pipe arrangement between a pump and a coating head is not larger than 50 mmφ, the pocket diameter of a magnetic composition coating head is 2 to 20 mmφ, the slit width of the magnetic composition coating head is 0.05 to 1 mm, and the slit length is 5 to 150 mm, although the invention is not limited to these values.

Ferromagnetic fine powder is used for forming a magnetic layer of a magnetic recording medium according to the present invention. As the ferromagnetic fine powder, the following known ferromagnetic fine powders may be used: $\gamma$-$Fe_2O_3$, Co-containing $\gamma$-$Fe_2O_3$, $Fe_3O_4$, Co-containing $Fe_3O_4$, $\gamma$-$FeO_x$, Co-containing $\gamma$-$FeO_x$ (X=1.33 to 1.50), $CrO_2$, a Co—Ni—P alloy, a Co—Ni—Fe—B alloy, an Fe—Ni—Zn alloy, an Ni—Co alloy, a Co—Ni—Fe alloy, etc. These ferromagnetic fine powders should have a grain size with a length between 0.005 and 1 micron, and a ratio of axis-length/axis-width between 1/1 and 50/1. The specific surface area of such ferromagnetic fine powder is about 1 to 70 $m^2$/g. Plate hexagonal barium ferrite may be used as the ferromagnetic fine powder. Regarding the grain size of barium ferrite, the diameter is preferably about 0.001 to 1 micron, and the thickness is ½ to 1/20 of the diameter. The specific gravity of barium ferrite is 4 to 6 g/cc, and the specific surface area is 1 to 70 m²/g. In the present invention, a binder is used for a magnetic layer together with ferromagnetic fine powder. The binder to be used can be a thermoplastic resin, thermosetting resin, reaction resin, or a mixture thereof.

If a thermoplastic resin is used, it should have a softening temperature not higher than 150° C., an average molecular weight in a range of from 10,000 to 300,000, and a degree of polymerization in a range of about 50 to 2,000. Specifically, the thermoplastic resin may be selected from a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, nylon-silicon system resin, nitrocellulosepolyamide resin, polyvinyl fluoride, a copolymer of vinylidene chloride and acrylonitrile, a copolymer of butadiene and acrylonitrile, polyamide resin, polyvinylbutyral, cellulose derivatives (cellulose acetate butyrate, cellulose diacetate, cellulose triacetate, cellulose propionate, nitro cellulose, etc.), a copolymer of styrene and butadiene, polyester resin, a copolymer of chlorovinyl ether and acrylate, amino resin, thermoplastic resin of various synthetic rubber systems, mixtures thereof, and so on.

If a thermosetting or reaction resin is used it should have a molecular weight not larger than 200,000 in the shape of a coating composition. If a composite to form a magnetic layer is applied, dried, and thereafter heated, however, such resin takes part in reaction such as condensation, addition, and so on, to thereby have unlimited molecular weight. In such a resin, preferable one is not to be softened or dissolved before resin is thermally decomposed. Examples of such resin include phenol resin, epoxy resin, setting polyurethan resin, urea resin, melamine resin, alkyd resin, silicon resin, reaction acrylic system resin, epoxy polyamide resin, nitrocellulose melamine resin, a mixture of high molecular weight polyester resin and an isocyanate prepolymer, a mixture of a methacrylate copolymer and a diisocyanate prepolymer, a mixture of polyester polyol and polyisocyanate, urea formaldehyde resin, a mixture of low molecular weight glycol, high molecular weight glycol and triphenyl methane triisocyanate, polyamide resin, mixtures thereof, and so on.

Similarly, conventionally used ferromagnetic fine powders may be dispersed in a binder; a solvent; additives such as a dispersing agent, a lubricating agent, an abrasive agent, an anti-electrification agent; a non-magnetic support; and so on. Examples of the dispersing agent include a selacic acid of carbon number 12 to 18 ($R_1COOH$, $R_1$ representing alkyl or alkenyl group of carbon number 11 to 17), such as a caprylic acid, a capric acid, a lauric acid, a myristic acid, a palmitic acid, a stearic acid, a oleic acid, an elaidic acid, a linoleic acid, a linolenic acid, a stearolic acid; a metal soap consisting of alkali metal (Li, Na, K, etc.) or alkaline-earth metal (Mg, Ca, Ba) of the above-mentioned selacic acid; a compound including fluorine of the above-mentioned selaic ester; an amide of the above-mentioned selacic acid; polyalkylene oxide alkyl phosphate; lecithin; trialkyl polyolefin oxy-fourth-ammoniate (carbon number of alkyl is 1 to 5, olefin is etylene, propylene, etc.); and so on. Other than those mentioned above, high grade alcohol of carbon number not less than 12, sulfate, and so on may be used.

As for the lubricating agent, while the above mentioned dispersing agents have the effect of lubrication, examples of the lubricating agent include silicon oil such as conductive fine powder of dialkyl polysiloxane (carbon number of alkyl is 1 to 5), dialkoxy polysiloxane (carbon number of alkoxy is 1 to 4), monoalkyl monoalkoxy polysiloxane (carbon number of alkyl is 1 to 5, and carbon number of alkoxy is 1 to 4), phenyl polysiloxane, phloroalkyl polysiloxane (carbon number of alkyl is 1 to 5), etc., graphite, etc.; non-organic fine powder such as molybdenum disulfide, tungsten dioxide, etc.; plastic fine powder such as polyethylene, polypropylene, copolymer of polyethylene-vinyl chloride, polytetrafluoro-ethylene, etc.; an α-olefin copolymer; selacic esters consisting of a mono-basic selacic acid of carbon number 12 to 20 and monovalent alcohol of carbon number 3 to 12, fluoro carbons, etc.

Examples of the abrasive agent include fused alumina, carbonized silicon, chromic oxide ($Cr_2O_3$), corundum, artificial corundum, diamond, artificial diamond, garnet, emery (main components: corundum and magnetite), etc..

Examples of the electrification preventing agent include conductive fine powder such as carbon black, a carbon black graft polymer, etc.; a natural surface-active agent such as saponin; a nonionic surface-active agent such as alkylene oxide systems, glycerin systems, glycidol systems, etc.; a cation surface-active agent such as high grade alkyl amines, fourth-class ammoniates, complex cyclos such as pyridine, and others, phosphoniums or sulfoniums, etc.; an anioic surface-active agent containing a base such as a carboxyl group, a sulfo group, a phosphoric group, a sulfuric ester group, a phosphoric ester group etc.; and a double-characteristic surface-active agent such as amino acids, amino-sulfo acids, sulfuric or phosphoric esters of amino alcohol, etc.

Examples of the organic solvent to be used as a coating solvent, include ketone systems such as acetone, methyl ethyl ketone, methyl isobutyl ketone, cyclohexanone, etc.; ester systems such as methyl acetate, ethyl acetate, butyl acetate, ethyl lactate, glycol acetate monoethyle ether, etc.; tar systems (aromatic hydrocarbons) such as benzene, toluene, xylene, etc.; hydrocarbon chlorides such as methylene chloride, ethylene chloride, carbon tetrachloride, chloroform, ethylene chlorohydrin, dichlorobenzene, etc.; and so on.

The quantity of the solvent is two to three times as much as that of the magnetic fine powder. Per binder 100 parts by weight, the dispersing agent is 0.5 to 20 parts by weight, the lubricating agent is 0.2 to 20 parts by weight, the abrasive agent is 0.5 to 20 parts by weight, the conductive fine powder to be used as the electrification preventing agent is 0.2 to 20 parts by weight, and the surface-active agent to be used as the anti-electrification agent in the same manner is 0.1 to 10 parts by weight. The magnetic powder, the binder, the dispersing agent, the lubricating agent, the abrasive agent, the electrification preventing agent, the solvent, etc., are mixed into a magnetic paint.

Examples of the materials for the support to be mounted with the magnetic layer include polyester such as polyethylene terephthalate, polyethylene naphthalate, etc.; polyolefin such as polypropylene, etc.; cellulose derivatives such as cellulose triacetate, cellulose diacetate, etc.; vinyl system resin such as polyvinyl chloride, etc.; plastic film of polycarbonate, polyamide resin, polysulfone, etc.; metal materials such as aluminum, copper, etc.; ceramics such as glass, etc.; and so on. These supports may be subjected to pre-treatment in advance, such as corona discharge treatment, plasma treatment, primer coating treatment, heat treatment, metal deposition treatment, alkali treatment, and so on. The supports may have various shapes desirably.

As has been described above, the coating apparatus according to the present invention is configured so that the filtration central-line waves ($W_{CA}$) in the support width direction of an inner surface of a slit, a frontedge surface and a backedge surface of a coating head for forming a coating layer are not larger than 0.2 μm. Accordingly, in spite of the fact that the coating head does not require the use of a coating composition having a smoothing function, it is possible to maintain a superior sectional shape when the coating composition is separated from the slit. In this manner, the coating composition is made uniform without any influence of an uneven distribution of extruded coating quantity caused by surface waves. Also, the characteristic of the coating surface is largely influenced when coating the surface with a thin layer at a high speed. Accordingly, it is possible to manufacture products having superior surfaces without the production of streaks caused by an uneven coating film thickness in the width direction.

A first example of the present coating apparatus is described hereafter.

After the following components of the coating composition were put into a ball mill, mixed and sufficiently dispersed, epoxy resin (epoxy equivalent 500) was added thereto in an amount of 30 parts by weight, mixed and dispersed uniformly to thereby prepare a magnetic coating composition (magnetic dispersion composition). When the viscosity of the thus-prepared magnetic coating composition was measured using a roto-viscometer, the thixotropic viscosities were as shown at the respective shear rate.

| Components of the coating composition: | |
|---|---|
| $\gamma$-$Fe_2O_3$ powder (needle-like particles of average grain size in the direction of length: 0.5 μm, coercive force: 320 oersted) | 300 parts by weight |
| copolymer of vinyl chloride and vinyl acetate (copolymerization ratio: 87:13 copolymerization degree: 400) | 30 parts by weight |
| conductive carbon | 20 parts by weight |
| polyamide resin (amin-valent: 300) | 15 parts by weight |
| lecithin | 6 parts by weight |
| silicon oil (dimethyl polysiloxane) | 3 parts by weight |
| xylene | 300 parts by weight |
| methyl isobutyl ketone | 300 parts by weight |
| n-butanol | 100 parts by weight |

Further, methyl isobutyl ketone was used as a pre-coating composition, and applied to a thickness of 4.0 μm (wet state) using a bar coating system. The thickness of the coating film was 15 μm (wet state).

A polyethylene terephthalate film having a thickness of 15 μm and a width of 500 mm was used as the support. The support was made to run under a tension of 10 kg/whole width and a coating speed of 600 m/min, while the filtration central-line waves ($W_{CA}$) of the slit inner surface 4, frontedge surface 5 and backedge surface 6 of the extrusion-type coating head shown in FIGS. 1–3 were set to values of 0.05 μm, 0.15 μm and 0.30 μm. Then, the states of production of uneven thickness (streaks caused by unevenness) were compared with each other in connection with the filtration central-line waves ($W_{CA}$). The result is shown in Table 1. The surface central-line roughness averages ($R_a$) of the slit inner surface 4, the frontedge surface 5 and the backedge surface 6 were set to 0.1 μm.

TABLE 1

| | Filtration central-line wave WCA (μm) | | | | |
|---|---|---|---|---|---|
| No. | Slit inner surface | Frontedge surface | Backedge surface | Judgment result | State of uneven streaks |
| (1) | 0.30 | 0.15 | 0.15 | X | slit inner surface wave pitch |
| (2) | 0.15 | 0.15 | 0.15 | ○ | |
| (3) | 0.05 | 0.15 | 0.15 | ○ | |
| (4) | 0.15 | 0.30 | 0.15 | X | frontedge surface wave pitch |
| (5) | 0.15 | 0.05 | 0.15 | ○ | |
| (6) | 0.15 | 0.15 | 0.30 | X | backedge surface wave pitch |
| (7) | 0.15 | 0.15 | 0.05 | ○ | |
| (8) | 0.05 | 0.05 | 0.05 | ⊙ | |
| (9) | 0.20 | 0.20 | 0.25 | Δ | |

In Table 1, ⊙ represents extremely superior, ○ represents superior, Δ indicates that no problems resulted during practical use in spite of the existence of an uneven condition, and x represents the existence of problems.

As shown in Table 1, when the filtration central-line wave WCA (μm) is selected to be 0.3 μm in any one of the slit inner surface 4, the frontedge surface 5 and the backedge surface 6 (i.e., cases No. (1), (4) and (6)), uneven streaks having pitches which approximate the pitches of surface waves are produced, and the quality of the products varied significantly along the width of the layer. Further, before completion of a product, a wrinkling effect could sometimes halt the operation of the equipment due, for instance, to a faulty coiling or cutting operation.

On the other hand, when the filtration central-line wave $W_{CA}$ (μm) is not larger than 0.15 μm in each of the slit inner surface 4, the frontedge surface 5 and the backedge surface 6 (i.e., Nos. (2), (3), (5), (7) and (8)), uneven streaks were not produced, and a superior magnetic recording media could be obtained. Particularly, in case No. (8), wherein each filtration central-line wave is 0.05 μm, no uneven streaks occur and extremely superior magnetic recording media are obtained stably.

In case No. (9), an intermediate degree of unevenness was produced because of larger waves in the backedge surface, but it was not a problem during practical use.

From the above results, it is understood that filtration central-line waves no larger than 0.2 μm correlate directly with the quality of the coating surface.

A coating apparatus for coating a magnetic coating composition for magnetic tape or the like according to a second embodiment of the present invention will be described below with reference to the accompanying drawings.

Figure 5:
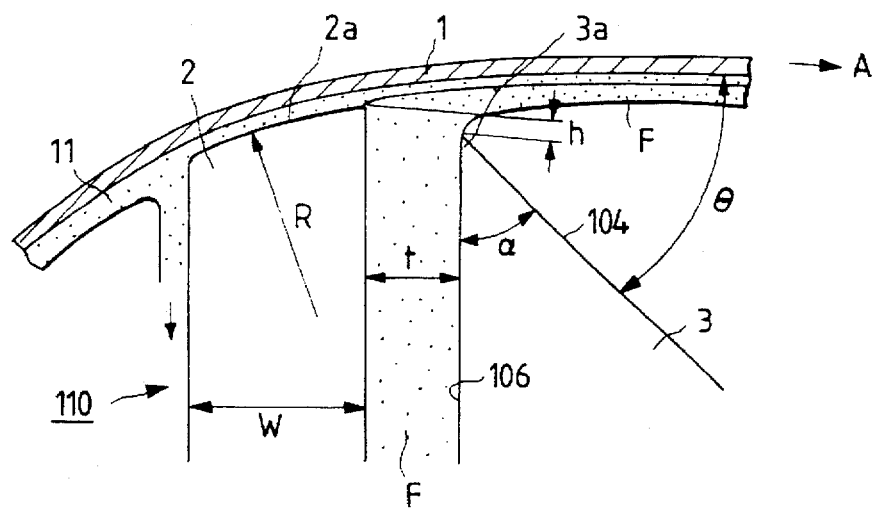
FIG. 5 is a schematic sectional view of a second embodiment of the coating apparatus according to the present invention.

FIG. 5 is a cross-sectional view of the coating apparatus in this embodiment. The state of application by the coating apparatus will be described. In the coating apparatus 110 shown in FIG. 5, a frontedge 2 disposed on the upstream side with respect to the direction of movement of a support 1 is formed so that its whole frontedge surface 2a opposite to the support 1 swells toward the support. Although a curved surface having a curvature (R) is generally used as a shape swelling toward the support, the shape is not limited to this but any shape such as for example a flat shape may be used so long as it can prevent air accompanying the support 1 from being caught into. A backedge 3 is formed so that a slit 106 is disposed between the backedge and the frontedge 2. A forward end portion 3a of the backedge 3 and its whole backedge surface 104 are formed so as to be lower than the top portion of the frontedge 2. That is, the forward end portion 3a of the backedge 3 is formed so that it retreats relative to the support 1 with difference in level compared with the backward end portion of the frontedge surface 2a.

The slit 106 may have a portion tapering toward the point of coating to the support 1 from a pocket not shown or may have a parallel portion as shown in the drawing.

In this embodiment, a pre-coating composition 11 is applied by using a suitable coating apparatus, that is, a generally used known coating apparatus, such as a gravure coater, a roll coater, a blade coater, an extrusion coater, or the like.

The coating apparatus for applying the pre-coating composition 11 and the aforementioned coating apparatus 10 shown in the drawing are suitably disposed at a predetermined distance. These coating apparatuses may be put separately between different pairs of guide rolls or may be put together between a pair of guide rolls.

Although the lap angle of the support 1 in the coating apparatus 10 shown in the drawing and the span in the guide rolls are respectively generally set to about 2° to 60° and 50 to 300 mm, they are not limited to these.

The pre-applied pre-coating composition 11 is an organic solvent solution and a low-viscosity liquid. This prevents accompanying air from being caught on the upstream side of the frontedge when the magnetic coating composition 3 is applied, so that a good state of application can be maintained.

The terminology "low-viscosity" used in the present invention means a viscosity of not higher than 10 cp, specifically, a liquid viscosity of not higher than 10 cp under the shear rate of 46500 sec$^{-1}$ measured by roto-viscometer. The terminology "coating composition (layer)" used in the present invention means a single magnetic coating composition (layer), a multi-layer structure of magnetic coating compositions (layers), and a magnetic coating composition (layer)-nonmagnetic layer combination including at least one magnetic layer, in the case of magnetic recording media. Also in the case of other materials than the magnetic recording media, a known layer structure can be used.

Figure 6:
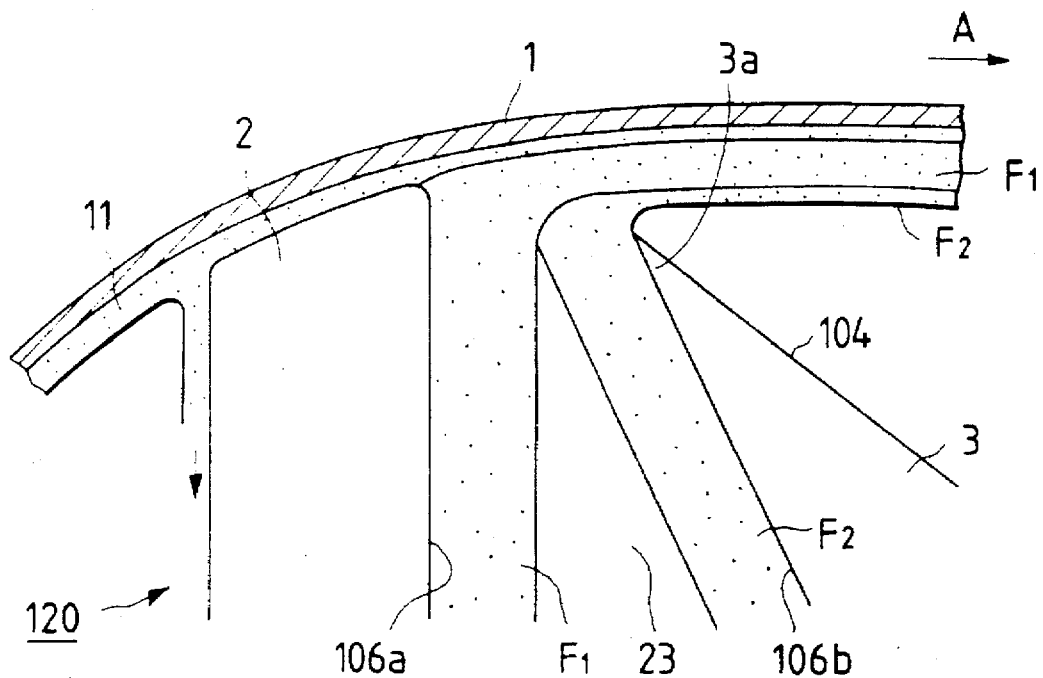
FIG. 6 is another schematic sectional view of the second embodiment of the coating apparatus according to the present invention.

In the case of multi-layer coating shown in FIG. 6, two slits 106a and 106b are formed by an intermediate block 23 but the structure of the coating head shown in FIG. 6 is substantially equivalent to the structure of the coating head shown in FIG. 5. In this case, two kinds of magnetic coating compositions or a magnetic coating composition and a nonmagnetic coating composition may be separately supplied and applied to the two slits 106a and 106b.

The characteristic structure of the coating apparatus 110 in this embodiment is in the forward end portion 3a of the backedge 3. That is, the forward end portion 3a is formed so that the contact angle with respect to ion exchange water is not smaller than 35°.

In the present invention, a water-repellent member is used as a material for forming the head forward end portion in each of the coating apparatuses 110 and 120. A material in which the contact angle with respect to ion exchange water is not smaller than 35°, preferably, not smaller than 40°, is used as the member. The "contact angle with respect to ion exchange water" described herein cannot only be determined by the quality of the member but can be determined by the surface characteristic (the degree of finishing) and cleanness of the member. The "contact angle with respect to ion exchange water" defined in the present invention is based on the case where an angle between the spherical surface of a water-drop and the surface of a subject with the passage of 15 seconds after dropping of 2 μl of ion exchange water to the surface of the subject (contact angle seen from the true side of the subject) is measured by a contact angle measuring apparatus CA-D made in KYOWA KAIMEN-KAGAKU Co., in the atmosphere of room temperature of 23° C. and humidity of 70%.

In the coating process, particularly, the forward end portion 3a of the backedge 3 is shaped like a sharp edge which is nearest to the support at the slit outlet portion. The coating composition F ejected from the slit 106 is departed from the forward end portion while delicate balance is maintained at the sharp-edge-shaped forward end portion, so that there is no smoothing at the downstream side of the forward end portion. When the forward end portion 3a which is a portion requiring to maintain such delicate balance is formed so as to satisfy the aforementioned numerical value, the coating composition F can be effectively prevented from going around to the backedge surface 104 side, for example, in the case where the ejection pressure of the coating composition or the behavior of the support changes.

A known technique is used for a liquid feeding system in accordance with the quality of the coating composition. Particularly in the case of a magnetic coating composition which has a coagulation characteristic, it is therefore preferable to give a shear not to condense. Specifically, methods according to Japanese Patent Application No. Sho. 63-63601, Japanese Patent Unexamined Publication No. Sho. 62-95174, and so on, can be used. In the case of the absence of a rotor as disclosed in Japanese Patent Application No. Sho. 63-63601, etc., for example, preferably the diameter of the pipe arrangement between a pump and a coating head is not larger than 50 mmφ, the pocket diameter of a magnetic composition coating head is 2 to 20 mmφ, the slit width of the magnetic composition coating head is 0.05 mm, and the slit length is 5 to 150 mm, but they are not always limited to these values.

Examples of the support used in the present invention include paper, plastic film, metal, resin-coated paper, synthetic paper, etc.

A second example of the present coating apparatus is described hereafter.

In the second example, a coating apparatus shown in FIG. 5 was used, and other than the coating apparatus, the coating composition and the material are the same as those used in the first example.

Coating was performed in the following conditions: the frontedge width W was 0.5 mm; the slit width t was 0.075 mm; the backedge angle α was 45 degrees; the angle θ between the support and the backedge surface was 45 degrees. The difference h in level between the frontedge and the backedge forward end was 0.07 mm.

As the coating head in the coating apparatus, two kinds of members different in surface characteristic were prepared for the three material qualities of stainless steel, super hard alloy and ceramics, so that six samples, in total, were prepared. The state of production of streaks caused by the stain of the backedge was examined to obtain results shown in Table 2.

With respect to the degree of surface finishing which determined the surface characteristic of the respective coating apparatus, the surface was finished up to the degree shown in Table 2.

TABLE 2

| Sample No. | Material Quality | Contact Angle | Degree of Surface finishing | Number of Streaks 1,000 m² | Evaluation |
|---|---|---|---|---|---|
| 1 | Stainless | 35 | 0.4S | 4.2 | ○ |
| 2 | Super hard alloy | 41 | 0.4S | 2.2 | ⊚ |
| 3 | Ceramics | 65 | 0.4S | 0.7 | ⊚ |
| 4 | Stainless Steel | 27 | 0.8S | 12.4 | X |
| 5 | Hard Metal | 33 | 0.8S | 7.3 | Δ |
| 6 | Ceramics | 46 | 0.8S | 1.9 | ⊚ |

In the evaluation in Table 2, ⊚ represents extremely superior in the surface characteristic of film, o represents superior, Δ represents no problem on practical use in spite of existence of problems, and x represents existence of problems on practical use.

It is apparent from Table 2 that the rate of production of streaks decreases as the contact angle increases, and that good results on practical use can be provided irrespective of the quality of the member so long as the member used can have the contact angle of not smaller than 35°.

Figure 7:
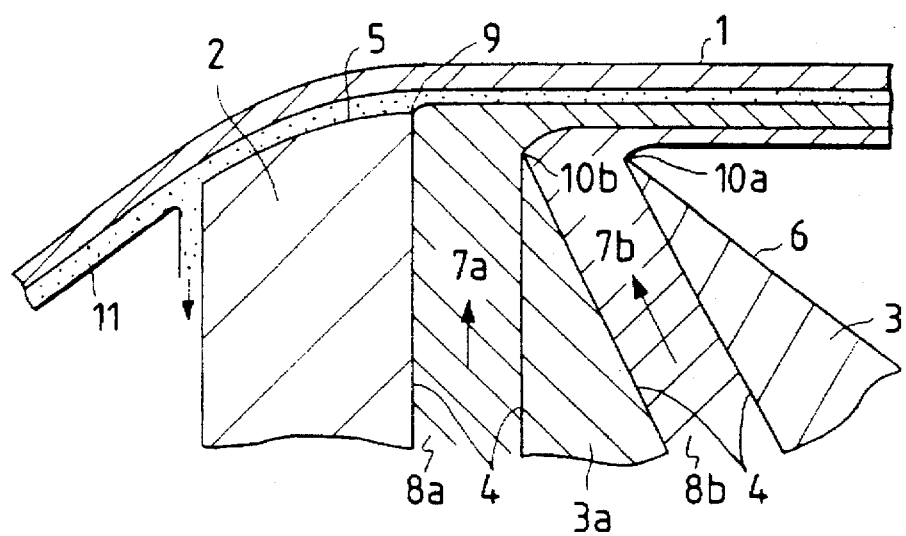
FIG. 7 is a schematic sectional view of a third embodiment of the coating apparatus according to the present invention.

In the third embodiment, as shown in FIGS. 3 and 7, it is preferable that the surface roughnesses of the slit inner surface 4 (including the inner surface 4 constituting slits at the intermediate block 3a), the frontedge surface 5 and the backedge surface 6 at the forward end portion of the coating head are small, but as a result of researches in the viewpoint of the state of production of streaks caused by aggregation of the coating composition 7 and by trapping of foreign matter, it has been found, surprisingly, that streaks are hardly produced under the condition that the center-line average roughness (Ra) is not larger than 1.0 μm which is a border. It is more preferable that the center-line average roughness (Ra) is not larger than 0.4 μm, and, under this condition, there is less production of such strips.

The surface roughness is measured according to Japanese Industrial Standard JIS-B0601 and indicated as center-line average roughness which is generally used. The cutoff value (λc) is 0.25 mm.

The backedge has two blocks, 3, 3a each having corner portions 10a, 10b, respectively. In the alternative, the backedge can have only one block and one corner portion.

Although it is desirable that there is no chipping of the frontedge corner portion 9 and the backedge corner portions 10a, 10b at the forward end portion of the coating head, fine chipping may occur actually in the grinding process. Therefore, as a result of researches in the viewpoint of the state of production of streaks caused by aggregation of the coating composition 7 and by trapping of foreign matter, it has been found that streaks as having influence on the quality thereof are hardly produced under the condition that the size of chips existing on the whole width of the forward end portion of the coating head is not larger than 10 μm. The condition that the size of chips is not larger than 5.0 μm is more preferable.

The chips are produced by dropping-out of part of particles constituting the forward end member in the grinding process, at the frontedge corner portion 9 and the backedge corner portions 10a, 10b at the forward end portion of the coating head, or the chips appear in the edge corner portions as fine void holes produced in the material sintering process. The size of one chip can be expressed by the direction of the width of the support and the direction of the depth thereof. Larger one of the width-direction size and the depth-direction size with respect to the support is employed as the chipping size used herein. That is, the chipping size (on the whole width) used herein is the maximum chipping size obtained by examining the whole width in the direction of the width.

In this embodiment, it is preferable that the material for the head forward end portion of the coating head is super hard alloy or ceramics.

Although the above-mentioned coating head is disposed between two guide rollers, another coating head for applying a pre-coating composition 11 may be provided between the coating head and the guide roller on the upstream side of the coating head. The lap angle in the coating head is about 2° to 60°. Although the span of the guide rollers to make a lap in this coating head is generally 50 to 3000 mm, it is not limited to this.

A liquid feeding system used herein is not limited specifically. A known technique is used for a liquid feeding system in accordance with the quality of the coating composition. Particularly in the case of a magnetic coating composition which has a coagulation characteristic, it is therefore preferable to give a shear not to condense. Specifically, reference is made to Japanese Patent Application No. Sho-63-63601, Japanese Patent Unexamined Publication No. Sho-62-95174, and so on. In the case of the absence of a rotor as disclosed in Japanese Patent Application No. Sho-63-63601, etc., preferably the diameter of the pipe arrangement between a pump and a coating head is not larger than 50 mmφ, the pocket diameter of a magnetic composition coating head is 2 to 20 mmφ, the slit width of the magnetic compositon coating head is 0.05 to 1 mm, and the slit length is 5 to 150 mm, but they are not always limited to these values.

As has been described above, in the coating apparatus according to the present invention, the center-line average roughness (Ra) in each of the slit inner surface, the frontedge surface and the backedge surface at the forward end portion of the extrusion coating head to form a coating layer is not larger than 1.0 μm. Accordingly, even in the case where the coating composition is not compressed at the time of application, the flow of the coating composition hardly falls into disorder so that a coating layer excellent in surface characteristic can be produced. Furthermore, because the coating composition is applied without any compression, liquid aggregation caused by the projecting of the coating composition hardly occurs so that products being so excellent in surface characteristic as to be free from the production of streaks caused by the trapping of foreign matter can be produced stably. Furthermore, because the chipping size in each of the frontedge corner portion and the backedge corner portion at the forward end portion of the extrusion coating head to form a coating layer is not larger than 10 μm, the flow of the coating composition as a meniscus departing from the forward end portion of the coating head hardly falls into disorder so that products being so excellent in surface characteristic as to be free from the production of streaks caused by the aggregation of the composition and by the trapping of foreign matter can be produced stably.

Next, novel effects of the apparatus according to the present invention will be made more clear by way of a third example.

After the components of the coating composition shown in the following were put into a ball mill, mixed and dispersed enough, epoxy resin (epoxy equivalent 500) was added thereto by 30 parts by weight, mixed and dispersed uniformly to thereby prepare a magnetic coating composition (magnetic dispersion composition).

When the thus prepared viscosity of the magnetic coating composition was measured by a roto-viscometer, thixotropic viscosities were shown at the respective shear rates.

The third example used the same as those used in the first example, other than the material of the support as mentioned below.

A polyethylene terephthalate film having a thickness of 15 μm and a width of 500 mm was used as the support. The support was made to run under the conditions of the tension of 10 kg/whole width and the coating speed of 600 m/min. The states of production of streaks were compared with each other while the center-line average roughnesses (μmRa) of the slit inner surface 4, frontedge surface 5 and backedge surface 6 of the extrusion-type coating head shown in FIG. 1 were changed in three levels of 0.4 μm, 1.0 μm and 2.0 μm and while the chipping sizes (μm maximum) at the frontedge corner portion 9 and backedge corner portion 10 were changed in three levels of 5 μm, 10 μm and 20 μm. The result is shown in Table 3.

On the other hand, in the respective cases of the extruders Nos. (1), (2) and (3), there is no production of streaks having problems in the quality of the products and in the after-process, so that excellent magnetic recording media are provided. Particularly, in the case of the extruder No. (1) in the condition that the surface roughness and chipping size are respectively 0.4 μm and 5 μm, no coating streak can be found so that a very excellent magnetic recording medium can be provided.

What is claimed is:

1. A coating apparatus having an extrusion head for applying a uniform thickness of a composition to a moving support, said coating head comprising:

a frontedge disposed on an upstream side of said coating head with respect to a direction of movement of said support, and a backedge disposed on a downstream side of said coating head with respect to said direction of movement of said support, a slit being formed between said frontedge and said backedge through which said composition is extruded, said slit extending in a longitudinal direction, wherein at least one of said front and backedges has a

TABLE 3

| | Surface Roughness Ra (μm) | | | | | | |
|---|---|---|---|---|---|---|---|
| | Slit | | | Chip Size (μm) | | | |
| Extruder | Inner Surface | Frontedge Surface | Backedge Surface | Frontedge Surface | Backedge Surface | Result | Remarks |
| 1 | 0.4 | 0.4 | 0.4 | 5 | 5 | ⊙ | No strips |
| 2 | 1.0 | 1.0 | 1.0 | 5 | 5 | ○ | 1 strip having no problem on characteristic |
| 3 | 2.0 | 1.0 | 1.0 | 5 | 5 | X | 10 streaks |
| 4 | 1.0 | 2.0 | 1.0 | 5 | 5 | X | 12 streaks |
| 5 | 1.0 | 1.0 | 2.0 | 5 | 5 | X | 15 streaks |
| 6 | 0.4 | 0.4 | 0.4 | 10 | 10 | ○ | 2 strips having no problem on characteristic |
| 7 | 0.4 | 0.4 | 0.4 | 20 | 10 | X | 18 streaks |
| 8 | 0.4 | 0.4 | 0.4 | 10 | 20 | X | 20 streaks |

As shown in Table 3, in the case where the surface roughness Ra (μm) is selected to be 2.0 μm in any one of the slit inner surface 4, the frontedge surface 5 and the backedge surface 6, that is, in the respective cases of the extruders Nos. (3), (4) and (5), 10 or more streaks are produced or a considerable number of streaks are produced if streaks having no problem on its characteristic are counted, and undesirably the quality of the products is deteriorated greatly. Further, in the after-process of the coating process before completion as a product, it becomes a cause of a large trouble which may break the equipment, such as a fault of coiling, cutting off caused by wrinkling. The cutoff value (λc) is 0.25 mm.

In the case where the chipping size (μm) is 20 μm either in the frontedge corner portion 9 or in the backedge corner portion 10, that is, in the respective cases of the extruders Nos. (7) and (8), production of streaks are so remarkable that a considerable number of streaks are produced if streaks having no problem on its characteristic are counted. Undesirably, the quality of the products is deteriorated greatly. Further, in the after-process of the coating process before completion as a product, it becomes a cause of a large trouble which may break the equipment, such as a fault of coiling, cutting off caused by wrinkling. Particularly, streaks having problems are almost in accord with positions where chips (larger than 10 μm) occur in the extruder.

surface adjacent said slit that includes a plurality of parallel, aligned filtration central line waves thereon extending in a direction perpendicular to said longitudinal direction, each of said filtration central line waves having a on average height greater than 0.03 μm and less than or equal to 0.2 μm.

2. The coating apparatus according to claim 1, wherein said backedge has a top end portion which recedes stepwise away from said frontedge and away from said support, said top end portion having a surface including said filtration central line waves.

3. The coating apparatus according to claim 1, wherein said backedge comprises a first edge member having a first surface and a second edge member having a second surface, each of said first and second edge member having an acute-angled top end portion, and each of said first and second surfaces including said filtration central line waves.

4. The coating apparatus according to claim 1, wherein said frontedge has an top end facing said support that includes said filtration central line waves.

5. The coating apparatus according to claim 1, wherein said slit comprised of inner surfaces that include said filtration central line waves.

6. The coating apparatus according to claim 1, wherein said filtration central line waves are formed on surfaces of said slit, a frontedge surface and a backedge surface of a top end portion of said coating head.

7. The coating apparatus according to claim 1, wherein said backedge includes an angled top end portion facing said support, said angled top end portion having a leading edge, on the upstream side of the backedge with respect to said direction of movement of said support, that is disposed further away from said support when said support is being coated by said apparatus with said composition than a top end portion of said frontedge.

8. The coating apparatus according to claim 1, wherein said frontedge includes a curved top end portion, said curved top end portion being curved to prevent air from travelling with a pre-coating composition between said frontedge and a support being coated by said apparatus with said composition.

9. The coating apparatus according to claim 1, wherein a forward end portion of said backedge is formed of a water-repellant material for which a contact angle with respect to ion exchange water is not smaller than 35°.

10. The coating apparatus according to claim 1, wherein a forward end portion of said backedge is formed of a water-repellant material for which a contact angle with respect to ion exchange water is not smaller than 40°.

* * * * *